United States Patent [19]
Ishikawa et al.

[11] Patent Number: 5,876,618
[45] Date of Patent: Mar. 2, 1999

[54] NI-ZN TYPE FERRITE

[75] Inventors: Katsuhisa Ishikawa; Yasuhiro Sasaki; Atsushi Ochi; Osamu Myohga; Yoshitsugu Okada, all of Tokyo, Japan

[73] Assignee: NEC Corporation, Tokyo, Japan

[21] Appl. No.: 974,190

[22] Filed: Nov. 19, 1997

[30] Foreign Application Priority Data

Nov. 20, 1996 [JP] Japan ..................................... 8-309285

[51] Int. Cl.$^6$ .................................................. C04B 35/30
[52] U.S. Cl. ...................................... 252/62.59; 252/62.62
[58] Field of Search ............................... 252/62.59, 62.62

[56] References Cited

U.S. PATENT DOCUMENTS

| | | | |
|---|---|---|---|
| 4,521,323 | 6/1985 | Hirota et al. | 252/62.59 |
| 4,808,327 | 2/1989 | Rousset et al. | 252/62.59 |
| 5,089,159 | 2/1992 | Tchernev | 252/62.59 |

FOREIGN PATENT DOCUMENTS

| | | | |
|---|---|---|---|
| 56-78428 | 6/1981 | Japan | 252/62.59 |
| 61-51405 | 11/1986 | Japan . | |

*Primary Examiner*—Melissa Bonner
*Attorney, Agent, or Firm*—Sughrue, Mion, Zinn, Macpeak & Seas, PLLC

[57] ABSTRACT

A Ni—Zn type ferrite has the composition represented by the general formula: $Ni_XZn_{1-X}Fe_{2-Y-Z}Mn_YZr_ZO_4$ ($0.55 \leq X \leq 0.80$, $0.001 \leq Y \leq 0.20$, $0.001 \leq Z \leq 0.04$). The Ni—Zn type ferrite is formed with the step described below. A raw powder is first mixed for 64 hours and then fired at 850° C. in an oxygen atmosphere for two hours. Next, the fired powder is crushed and then the crushed powder is again mixed. Then, a binder is added to the resulting powder, which is then press-formed under a pressure of 2.5 ton/cm$^2$, and the press-formed powder is sintered at 1350° C. for 5 hours in an oxygen atmosphere.

8 Claims, No Drawings

NI-ZN TYPE FERRITE

BACKGROUND OF THE INVENTION

1. Field of the Invention

This invention relates to a Ni—Zn type ferrite which is suitable for magnetic materials of an isolator and the like used in a millimeter wave frequency band in high frequency fields, small in dielectric loss, and high in saturated magnetization.

2. Description of the Related Art

A Ni—Zn type ferrite is one of typical ferrites which are suitable for device elements such as a circulator for communication and the like used in a microwave frequency band. Recently device elements such as a circulator and the like which act in a frequency range of tens to hundreds of GHz have been primarily developed. It is indispensable for such a device element to have not only high saturated magnetization ($4\pi M_s$), small ferromagnetic resonance absorption half width ($\Delta H$), and high Curie point, but also small dielectric loss ($\tan\delta(\epsilon)$) to secure the reliability of the device. Therefore, there is a strong desire to develop materials with small dielectric loss ($\tan\delta(\epsilon)$). In this situation, ferrites represented by the general formula: $Li_{0.5-0.5x-0.5y}Fe_{2.5-0.5x-0.5y}Zn_xMn_yO_4$ ($0.15 \leq x \leq 0.45$, $0.02 \leq y \leq 0.18$) are proposed (Japanese Unexamined Patent Publication (Kokai) No. 61-51405). The conventional ferrites described in this publication are produced by substituting a part of the composition of a lithium ferrite, which is represented by the general formula: $Li_{0.5}Fe_{2.5}O_4$, with Zn and Mn. With this conventional ferrite, high saturated magnetization ($4\pi M_s$) and dielectric loss ($\tan\delta(\epsilon)$) of the order of $10^{-3}$ are attained.

With advanced densifying of information and the like, however, the development of ferrites, which can be used for device elements such as a circulator and the like utilized in a higher frequency GHz band, is more strongly desired. From this reason, the development of ferrites with a high saturated magnetization ($4\pi M_s$) and dielectric loss ($\tan\delta(\epsilon)$) of the order of $10^4$ is in large demand.

SUMMARY OF THE INVENTION

An object of the present invention is to provide a ferrite with a small dielectric loss ($\tan\delta(\epsilon)$) of the order of $10^4$ and a high saturated magnetization ($4\pi M_s$) A Ni—Zn type ferrite according to the present invention has the composition represented by the general formula: $Ni_xZn_{1-x}Fe_{2-Y-Z}Mn_YZr_ZO_4$, wherein the value of X is in the range of 0.55 to 0.80, the value of Y is in the range of 0.001 to 0.20, and the value of Z is in the range of 0.001 to 0.04.

For the Ni—Zn type ferrite of the present invention, since not only the contents of Ni and Zn but also the contents of Fe, Mn and Zr are defined, a small dielectric loss ($\tan\delta(\epsilon)$) of the order of $10^4$ can be attained while a high saturated magnetization ($4\pi M_s$) is kept.

DETAILED DESCRIPTION OF THE PREFERRED EMBODIMENTS

The inventors of the present application have conducted intensive studies to solve the above problems and, as a result, found that a small dielectric loss ($\tan\delta(\epsilon)$) can be attained, while a high saturated magnetization ($4\pi M_s$) is maintained, by appropriately determining the values of X, Y, and Z in a Ni—Zn type ferrite represented by the general formula: $Ni_xZn_{1-x}Fe_{2-Y-Z}Mn_YZr_ZO_4$.

The reason why the value of X, Y, and Z are defined is now explained.

First, the value of X defines the contents of Ni and Zn. If the value of X is less than 0.55 or over 0.80, the dielectric loss ($\tan\delta(\epsilon)$) increases. Therefore, the value of X is defined in the range of 0.55 to 0.80.

Next, the value of Y defines the content of Mn. If the value of Y is less than 0.001, the dielectric loss ($\tan\delta(\epsilon)$) increases. On the other hand, if the value of Y is over 0.20, the saturated magnetization ($4\pi M_s$) decreases. Therefore, the value of Y is defined in the range of 0.001 to 0.20.

Thirdly, the value of Z defines the content of Zr.

If the value of Z is less than 0.001 or over 0.04, the dielectric loss ($\tan\delta(\epsilon)$) increases. Therefore, the value of Z is defined in the range of 0.001 to 0.04.

The above Ni—Zn type ferrite can be formed by sintering raw powder with a conventional method.

Next, examples of the present invention are now explained in comparison with comparative examples which are excluded from the claim of the present invention. First, raw powder was mixed for 64 hours and then fired at 850° C. in an oxygen atmosphere for two hours. Next, the fired powder was crushed and then the crushed powder was again mixed. Then a binder was added to the resulting powder, which was then press-formed under a pressure of 2.5 ton/cm². The press-formed powder was sintered at 1350° C. for 5 hours in an oxygen atmosphere to form the ferrites of examples of the present invention and the comparative examples represented by the composite formulae shown in the Table 1 described below.

TABLE 1

|  | No. | Composite formulae |
|---|---|---|
| Example of Present Invention | 1 | $Ni_{0.55}Zn_{0.45}Fe_{1.96}Mn_{0.03}Zr_{0.01}O_4$ |
|  | 2 | $Ni_{0.8}ZN_{0.2}Fe_{1.96}Mn_{0.03}Zr_{0.01}O_4$ |
|  | 3 | $Ni_{0.6}Zn_{0.4}Fe_{1.96}Mn_{0.03}Zr_{0.01}O_4$ |
|  | 4 | $Ni_{0.6}Zn_{0.4}Fe_{1.998}Mn_{0.001}Zn_{0.001}O_4$ |
|  | 5 | $Ni_{0.6}Zn_{0.4}Fe_{1.79}Mn_{0.20}Zr_{0.01}O_4$ |
|  | 6 | $Ni_{0.6}Zn_{0.4}Fe_{1.95}Mn_{0.03}Zr_{0.02}O_4$ |
| Comparative Example | 7 | $Ni_{0.5}Zn_{0.5}Fe_{1.96}Mn_{0.03}Zr_{0.01}O_4$ |
|  | 8 | $Ni_{0.85}Zn_{0.15}Fe_{1.96}Mn_{0.03}Zr_{0.01}O_4$ |
|  | 9 | $Ni_{0.6}Zn_{0.4}Fe_{1.97}Zr_{0.03}O_4$ |
|  | 10 | $Ni_{0.6}Zn_{0.4}Fe_{1.72}Mn_{0.25}Zr_{0.03}O_4$ |
|  | 11 | $Ni_{0.6}Zn_{0.4}Fe_{1.97}Mn_{0.03}O_4$ |
|  | 12 | $Ni_{0.6}Zn_{0.4}Fe_{1.90}Mn_{0.03}Zr_{0.07}O_4$ |
|  | 13 | $Li_{0.31}Zn_{0.28}Fe_{2.31}Mn_{0.10}O_4$ |

Next, for each example of the present invention and comparative example, a hysteresis loop with the maximum magnetic field of 10 kG was drawn using a VSM magnetic detector and the saturated magnetization was calculated by extrapolation from the hysteresis loop. Also, a disk-like sample for analysis with a diameter of 16 mm and a thickness of 0.2 mm was prepared. The dielectric loss of the sample for the analysis was measured in an electromagnetic field of 9 GHz according to a TE112 mode cavity resonance method. The results are shown in Table

TABLE 2

|  | No. | $4\pi M_s$ | $\tan\delta(\epsilon)$ |
|---|---|---|---|
| Example of Present Invention | 1 | 4900 | $4 \times 10^{-4}$ |
|  | 2 | 4950 | $5 \times 10^{-4}$ |
|  | 3 | 5100 | $3 \times 10^{-4}$ |
|  | 4 | 5100 | $6 \times 10^{-4}$ |
|  | 5 | 4440 | $4 \times 10^{-4}$ |
|  | 6 | 5250 | $6 \times 10^{-4}$ |
| Comparative | 7 | 4700 | $5 \times 10^{-3}$ |

TABLE 2-continued

| | No. | $4\pi M_s$ | $\tan\delta(\epsilon)$ |
|---|---|---|---|
| Example | 8 | 4750 | $2 \times 10^{-3}$ |
| | 9 | 5050 | $1 \times 10^{-2}$ |
| | 10 | 3900 | $9 \times 10^{-3}$ |
| | 11 | 5000 | $8 \times 10^{-3}$ |
| | 12 | 4900 | $9 \times 10^{-3}$ |
| | 13 | 5045 | $5 \times 10^{-3}$ |

As shown in table 2, since the compositions in Examples of Present Invention 1 to 6 were appropriate, small dielectic losses ($\tan\delta(\epsilon)$) of the order of $10^{-4}$ were exhibited. Also, sufficiently high saturated magnetizations ($4\pi M_s$) were exhibited in each of the compositions of Examples of Present Invention 1 to 6. Particularly, an extremely small dielectric loss could be attained in Example 3 and an extremely high saturated magnetization could be attained in Example 6.

On the other hand, in Comparative Example 7, because the content of Ni was less than the lower limit of the range defined in the present invention, a large dielectric loss of the order of $10^{-3}$ was exhibited, though its saturated magnetization was as high as 4700 G. In Comparative Example 8, because the content of Ni was over the upper limit of the range defined in the present invention, a large dielectric loss of the order of $10^{-3}$ was exhibited, though its saturated magnetization was as high as 4750 G.

In Comparative Example 9, because Mn was not contained, an extremely large dielectric loss of the order of $10^{-2}$ was exhibited, though its saturated magnetization was as high as 5050 G. In Comparative Example 10, because the content of Mn was over the upper limit of the range defined in the present invention, the saturated magnetization was 3900 G and a large dielectric loss of the order of $10^{-3}$ was exhibited.

In Comparative Example 11, because Zr was not contained, a large dielectric loss of the order of $10^{-3}$ was exhibited, though its saturated magnetization was as high as 5000 G. In Comparative Example 12, because the content of Zr was over the upper limit of the range defined in the present invention, a large dielectric loss of the order of $10^{-3}$ was exhibited, though its saturated magnetization was as high as 4900 G.

In Comparative Example 13, which is a conventional lithium ferrite, a large dielectric loss of the order of $10^{-3}$ was exhibited, though its saturated magnetization was as high as 5045 G.

What is claimed is:

1. A Ni—Zn type ferrite having the composition represented by the general formula: $Ni_X Zn_{1-X} Fe_{2-Y-Z} Mn_Y Zr_Z O_4$, the value of X being in the range of 0.55 to 0.80, the value of Y being in the range of 0.001 to 0.20, and the value of Z being in the range of 0.001 to 0.04.

2. A Ni—Zn type ferrite according to claim 1, which is formed by sintering raw powder comprising the elements nickel, zinc, iron, manganese and zirconium.

3. A Ni—Zn type ferrite according to claim 1, wherein the value of X is 0.6, the value of Y is 0.03, and the value of Z is 0.01.

4. A Ni—Zn type ferrite according to claim 1, wherein the value of X is 0.6, the value of Y is 0.03, and the value of Z is 0.02.

5. A Ni—Zn type ferrite according to claim 1, wherein the value of X is 0.55, the value of Y is 0.03, and the value of Z is 0.01.

6. A Ni—Zn type ferrite according to claim 1, wherein the value of X is 0.8, the value of Y is 0.03, and the value of Z is 0.01.

7. A Ni—Zn type ferrite according to claim 1, wherein the value of X is 0.6, the value of Y is 0.001, and the value of Z is 0.001.

8. A Ni—Zn type ferrite according to claim 1, wherein the value of X is 0.6, the value of Y is 0.20, and the value of Z is 0.01.

* * * * *

UNITED STATES PATENT AND TRADEMARK OFFICE
CERTIFICATE OF CORRECTION

PATENT NO. : 5,876,618
DATED : March 2, 1999
INVENTOR(S) : Katsuhisa ISHIKAWA et al.

It is certified that error appears in the above-identified patent and that said Letters Patent is hereby corrected as shown below:

Column 2, line 36 (TABLE 1) delete "$ZN_{0.2}$" and insert --$Zn_{0.2}$--.

Signed and Sealed this

Seventeenth Day of August, 1999

Q. TODD DICKINSON

Attest:

Attesting Officer

Acting Commissioner of Patents and Trademarks